United States Patent [19]

Ramstedt

[11] Patent Number: 5,025,218

[45] Date of Patent: Jun. 18, 1991

[54] PULSED FIELD SYSTEM FOR DETECTING THE PRESENCE OF A TARGET IN A SUBSURFACE ENVIRONMENT

[75] Inventor: Clarence F. Ramstedt, San Diego, Calif.

[73] Assignee: The United States of America as represented by the Secretary of the Navy, Washington, D.C.

[21] Appl. No.: 32,815

[22] Filed: Apr. 23, 1979

[51] Int. Cl.$^5$ .......................... G01V 3/08; G01V 3/10; G01V 3/12

[52] U.S. Cl. .................................. 324/334

[58] Field of Search ............... 324/329, 330, 334, 337, 324/344; 340/850; 343/5 SA, 5 NA

[56] References Cited

U.S. PATENT DOCUMENTS 3,852,659 12/1974 Barringer ............................ 324/334

Primary Examiner—Theodore M. Blum

Attorney, Agent, or Firm—Harvey Fendelman; Thomas Glenn Keough; James O. Skarsten

[57] ABSTRACT

In a method and apparatus for searching a subsurface environment to detect the presence of a target therein, an electromagnetic field is emitted which comprises successive electromagnetic pulses of selected duty cycle, the time interval between pulses comprising a zero emission interval and a sampling interval, the sampling interval following the zero emission interval, and the polarity of the pulses of the emitted field alternating at a selected alternating frequency. The emitted field is projected into the environment from a selected location, and the electromagnetic field proximate to the selected location is sampled during each of the sampling intervals to provide a train of proximate field samples. The train of proximate field samples is spectrum analyzed to determine whether or not the field proximate to the selected location contains a component having a frequency which is equal to the alternating frequency.

11 Claims, 2 Drawing Sheets

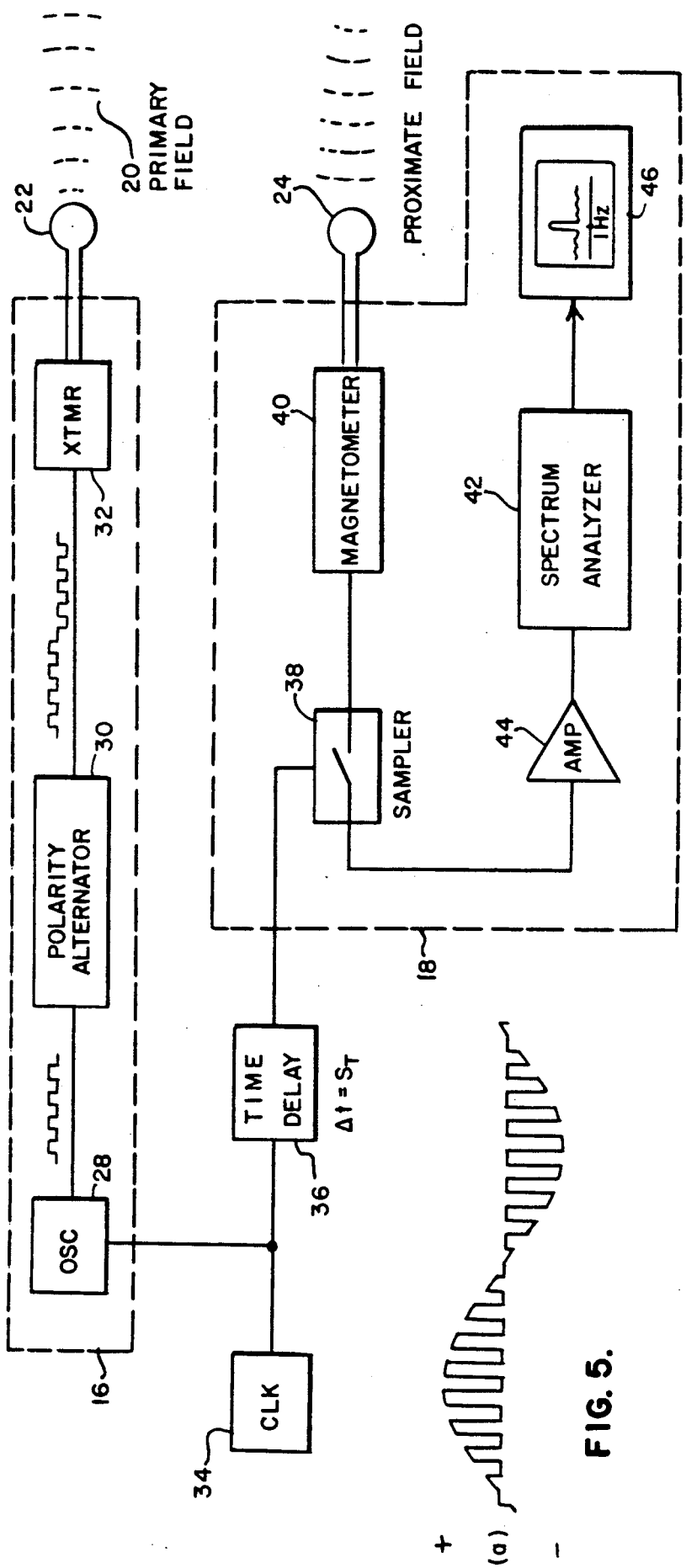
FIG. 4.
FIG. 5.
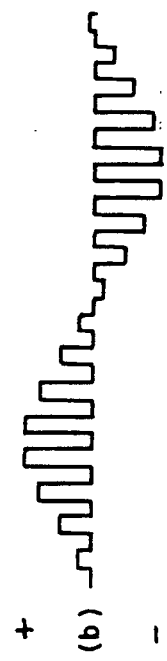
FIG. 6.

PULSED FIELD SYSTEM FOR DETECTING THE PRESENCE OF A TARGET IN A SUBSURFACE ENVIRONMENT

BACKGROUND OF THE INVENTION

The invention disclosed and claimed herein pertains generally to a system for detecting an anomalous target in an environment by emitting a search field comprising a series of electromagnetic pulses. More particularly, the invention pertains to such a system which is adapted to detect an anomalous target in a subsurface environment, such as a natural body of water or a portion of the earth's crust. Even more particularly, the invention pertains to a system for detecting a target in a subsurface environment, wherein a low frequency field which is backscattered from the target, and which is generated by a number of successive pulses, is isolated or separated at a detector from the scattering effects of individual pulses.

Radar is a well known example of a system which employs a pulsed search field to detect an anomalous target in the atmosphere. Pulsed field emission is required in order to provide intervals during which a portion of the emitted field, which has been reflected or backscattered by the target, can be detected at the site of pulse transmission without interference from the emitted field.

If an electromagnetic field is projected into a subsurface environment, such as an ocean body or a portion of the earth's crust, the frequency thereof must be in the Extremely Low Frequency (ELF) range, on the order of 1 Hz–100 Hz, to prevent the field from being substantially attenuated. The projection of an electromagnetic field at such low frequency is generally quite difficult, due to the cumbersome nature of the antenna and related equipment required therefor. Also, the time period of a single sinewave of an ELF field is comparatively long, e.g., 1 sec for a frequency of 1 Hz. In a search system of such low frequency, it is not possible to isolate a field backscattered by a target from interfering effects of the primary or emitted field of the system, as is done in radar. The distance traveled by a single emitted sinewave is so great that a target anomaly detected by the system must be located a very great distance from the point of emission to enable the system to operate. For example, for a sinewave of 1 Hz frequency target distance must be on the order of half the distance of the moon from the earth.

To provide a pulsed field technique for mineral exploration in the earth's crust, which overcomes the above problems, a prior art system projects a primary field comprising high repetition rate into the earth. If conductive ore bodies are contained therein, each emitted pulse generates an eddy current in the ore bodies. Then, during the interval following a pulse, the eddy current decays, generating a detectable transient magnetic field. Such secondary transient field is sampled during the interval at a high sampling frequency, and the sampled data is processed according to conventional techniques to provide information locating the ore bodies. However, in such system, a very large part of the secondary field is discarded, since it is generated during the period of the primary pulse.

In other systems for geological applications, a complex primary field is projected into the earth, and a received secondary field is matched with waveforms representing various geological structures to determine the best fit therebetween. Such systems, however, may require very elaborate computer systems and special algorithms.

In the present invention, a pulsed field search system is provided which senses the presence of an anomalous target in a subsurface environment solely by the detection of a field of very low frequency which has been backscattered from the target. Data processing equipment required for the system is greatly simplified, and an embodiment thereof may be very usefully employed to detect metallic or other anomalous targets in natural bodies of water, such as ocean bodies. It is anticipated that an embodiment of the invention may also be employed to detect tunnels or other voids in a portion of the earth's crust.

SUMMARY OF THE INVENTION

The present invention discloses a pulsed field method for searching a subsurface environment, such as an ocean body, to detect the presence therein of an anomalous target, such as a metallic object. The method includes the step of emitting a primary electromagnetic field comprising pulses of selected duty cycle, the time interval between the pulses comprising a zero emission interval and a sampling interval, the sampling interval following the zero emission interval, and the polarity of successive groups of pulses alternating at a selected alternating frequency. The method further includes the steps of projecting the emitted field into the environment from a selected location, and sampling the electromagnetic field proximate to the selected location during each of the sampling intervals to provide a train of proximate field samples. The train of field samples is spectrum analyzed to detect the presence in the proximate field of a field component having a frequency which is equal to the pulse group alternating frequency.

To isolate the proximate field during a sampling interval from the effects of the emitted primary pulse preceding the sampling interval, the emitting step preferably comprises the step of emitting a succession of pulses wherein the zero emission interval following a given emitted pulse is of sufficient time duration to allow transient field components and reflected field components generated by the given pulse to become substantially undetectable at the selected location before the conclusion of the zero emission interval following the given pulse. The transient and reflected components of an emitted pulse are hereinafter defined. Preferably also, the pulse group alternating frequency is selected to be equal to the frequency of a target detection field, the frequency of the target detection field being in the ELF range so that it may traverse the subsurface environment without significant attenuation.

The present invention also discloses apparatus for detecting the presence of an anomalous target located in a subsurface environment, the apparatus including oscillating means for generating a train of pulses of selected duty cycle, the time interval between pulses comprising a zero emission interval and a sampling interval, the sampling interval following the zero emission interval. Means are coupled to the oscillating means for alternating the polarity of pulses of the pulse train each time a selected number of pulses has been generated, to provide pulse groups of like polarity, the frequency at which the polarity of the pulses is alternated being equal to the frequency of a target detection field, the reciprocal of the frequency of the target detection field exceeding the time interval between successive pulses. The apparatus further includes means coupled to the alternating means for projecting the pulses into the subsurface environment from a selected location, the projected pulses comprising a primary electromagnetic field, and means for providing a train of proximate field samples, each of the samples representing the electromagnetic field proximate to the selected location during an instantaneous sampling period which is taken during one of the sampling intervals. Spectral processing means receiving the proximate field samples provide the spectra of the proximate electromagnetic field and means are provided for indicating the presence in the spectra of a component having a frequency which is equal to the frequency of the target detection field.

OBJECTS OF THE INVENTION

An object of the present invention is to provide a new and improved pulsed search system for detecting an anomalous target in a subsurface environment, such as an object in a natural body of water, by detecting a field scattered from the target, the scattered field being of low frequency whereby it traverses the subsurface environment without significant attenuation.

Another object is to provide a system of the above type which emits a field comprising electromagnetic pulses, the polarity of the pulses being periodically alternated to generate a primary field which includes a field component of the above low frequency.

Another object is to substantially simplify the signal processing which is required to detect an anomalous target in a subsurface environment by means of a pulsed search system.

Another object is to provide a system for detecting a target in a subsurface environment, wherein a field comprising electromagnetic pulses is projected into the environment, and wherein a low frequency field component, backscattered by the target, is detected during the interval following a projected pulse, after transient and reflected field components generated by the pulse have died out at the location of detection, whereby the low frequency detection field is effectively isolated or uncoupled from the effects of individual pulses.

Another object is to provide a pulsed search system for detecting the presence of an object in a subsurface environment which may be employed aboard an aircraft to enable a large region of the environment to be rapidly searched.

Another object is to provide a system wherein a field comprising electromagnetic pulses is projected into a subsurface environment, wherein the field is backscattered by a target in the environment, and wherein the higher frequency components of the projected and backscattered fields are substantially attenuated by the environment, the target being detected by detecting a low frequency component of the backscattered field.

These and other objects of the invention will become more readily apparent from the ensuing specification when taken together with the drawings.

BRIEF DESCRIPTION OF THE DRAWINGS

FIG. 4 is a block diagram showing the components of the embodiment of FIG. 1.

FIGS. 5-6 are plots of amplitude vs. time which show primary electromagnetic fields emitted by modifications of the embodiment of FIG. 1.

DESCRIPTION OF THE PREFERRED EMBODIMENT

Figure 1:
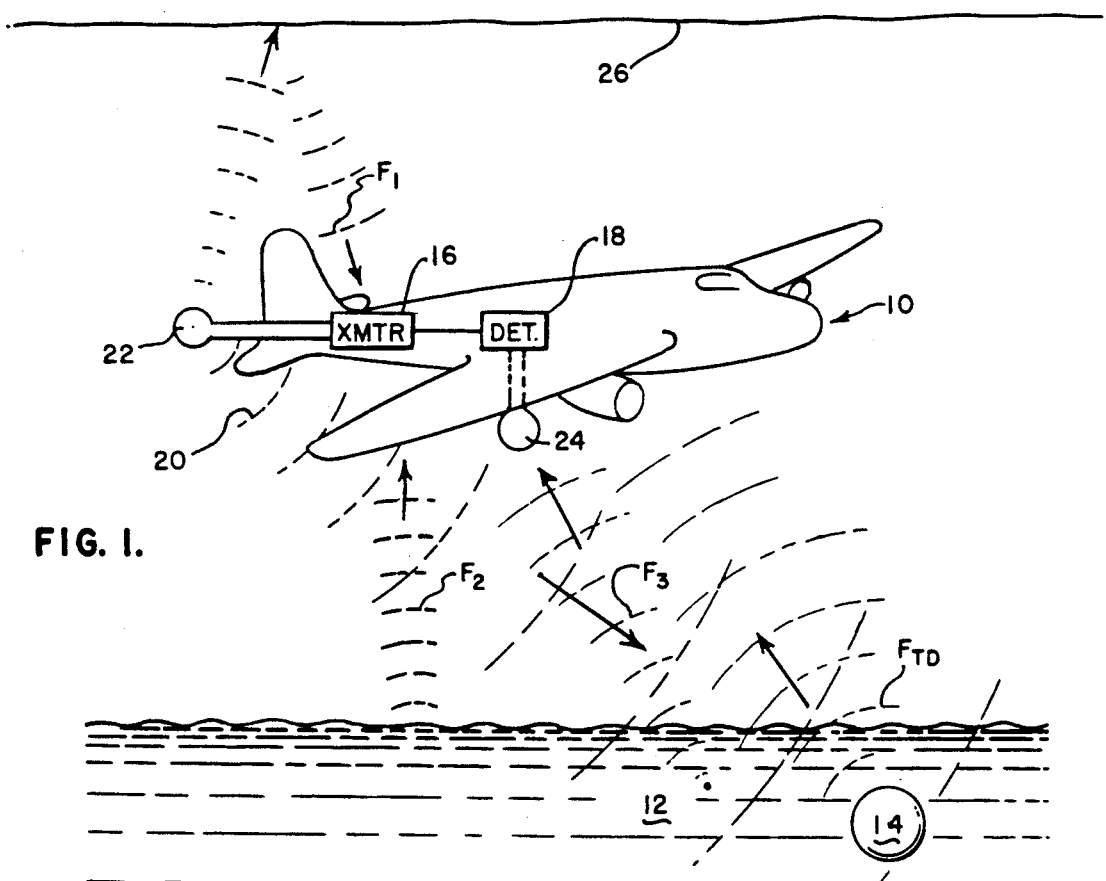
FIG. 1 is a perspective view showing an embodiment of the invention employed by an aircraft to search an ocean environment for a target contained therein.

Referring to FIG. 1, there is shown an aircraft 10 employing an embodiment of the invention to search a subsurface environment 12, such as an ocean body, for an anomalous target 14. Anomalous target 14 is an object having a conductivity, permeability, and/or permittivity which is different from the like parameter of environment 12. The embodiment aboard aircraft 10 comprises a transmitting component or transmitter 16 and a reception component or detector 18. Transmitter 16 emits a pulsed electromagnetic field, or primary field 20, which is projected by antenna 22 toward environment 12, and detector 18 is operated synchronously with transmitter 16 to periodically sample the electromagnetic field which is proximate to the location of aircraft 10, through an antenna 24.

Figure 2:
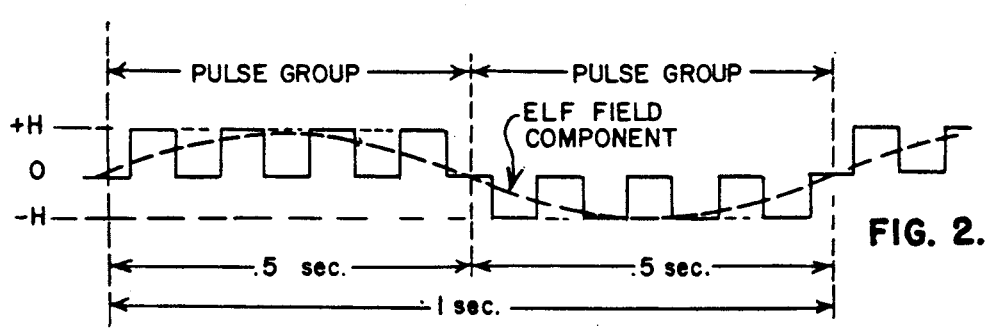
FIG. 2 is a plot of amplitude vs. time which shows the primary electromagnetic field emitted by the embodiment of FIG. 1.

Referring to FIG. 2, there is shown the emitted primary field 20 comprising successive electromagnetic pulses of equal amplitude H, eight pulses being emitted per second, and the interval between pulses being determined by the pulse emission rate and by the duty cycle of the pulses, which may be usefully selected to be 50%. It will be noted from FIG. 2 that the polarity of the pulses alternates twice a second, or at a frequency of 1 Hz, so that field 20 comprises successive pulse groups, of four unipolar pulses per group. Emitted field 20 therefore includes a low frequency fundamental, determined by the alternating frequency, or rate of pulse group polarity reversal. The higher frequency harmonics are determined by the number of pulses included in a pulse group. It will be readily apparent that the particular rate of polarity reversal and number of pulses per group will be determined by the particular application of the present invention.

Since the low frequency component of field 20 is in the ELF range of 1 Hz-100 Hz, it penetrates ocean environment 12 without being significantly attenuated. Upon encountering target 14, a portion of the low frequency component is backscattered thereby back toward aircraft 10. Such backscattered portion is hereinafter referred to as the target detection field, and is shown in FIG. 1 as field $F_{TD}$. If the target detection field can be isolated or uncoupled from primary field 20, and from interfering effects generated by the individual pulses thereof, it can be sensed by detector 18 to indicate the presence of target 14 in environment 12.

Referring again to FIG. 1, there is shown field $F_1$ in proximity to aircraft 10, field $F_1$ comprising a transient generated by the reflection component of one of the pulses of primary field 20 off ionosphere 26. Similarly, field $F_2$ represents a transient component, generated by the reflection of an emitted pulse off of the surface of environment 12, back toward aircraft 10. If there are other pulse reflective media within range of emitted field 20, such as land masses, additional reflected or transient components will be projected thereby to the proximity of aircraft 10. It will be readily apparent that transient fields caused by reflection of a given pulse of field 20 will be detectable in the proximity of aircraft 10 for some interval after the conclusion of the given pulse, and may prevent detection of the low frequency target detection field. For an aircraft altitude of 500 ft, and in the absence of all reflective media except the surface of environment 12 and the ionosphere 26, it is anticipated that such an interval would be on the order of tens of milliseconds. For example, 30 milliseconds could be required, from the conclusion of a pulse of field 20, for components of the pulse to become undetectable in proximity to aircraft 10.

Referring further to FIG. 1, there is shown field $F_3$ in proximity to aircraft 10, field $F_3$ comprising further transient components generated by an emitter pulse of field 20, which are present in the proximity of aircraft 10 for an interval following the conclusion of the pulse. When a pulse of field 20 is emitted, it induces eddy currents in the water volume of environment 16, which is a conductive body. At the conclusion of the pulse, the eddy currents proceed to decay, whereby secondary transient fields are generated. Such transient fields may prevent accurate reception of the target detection field, until they have decayed to a level at which they are no longer detectable. For the system shown in FIG. 1, it is anticipated that such decay time is on the order of milliseconds, such as 10 milliseconds.

Figure 3:
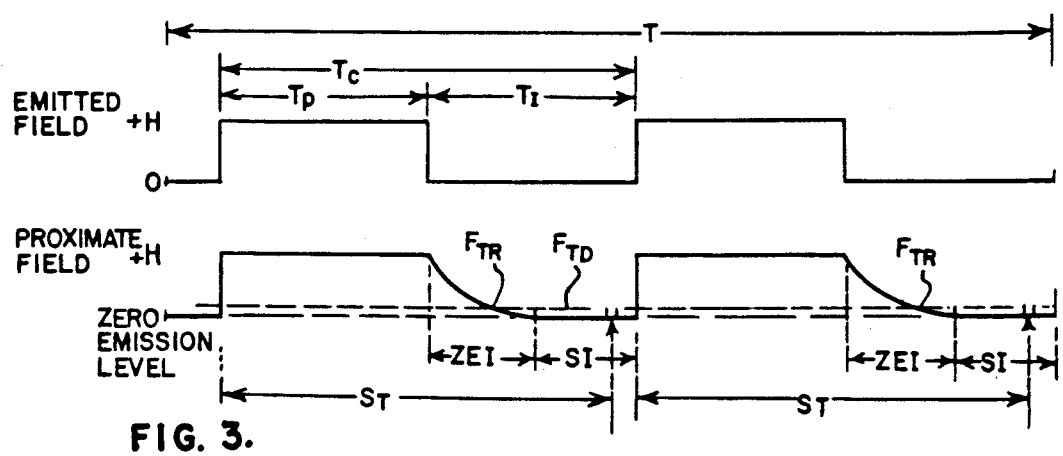
FIG. 3 is a plot which shows the relationship over time between the field emitted by the embodiment of FIG. 1 and the electromagnetic field in proximity to the location of the embodiment of FIG. 1.

Referring to FIG. 3, there is shown a comparison of the primary EM field emitted by transmitter 16 and the EM field in proximity to detector 18, over a time period T. For a pulse emission rate of eight pulses per second, pulse cycle time $T_c$, the duration of a pulse and the interval which follows until the next pulse, is approximately 120 msec. For a 50% duty cycle, the duration of a pulse $T_p$ and the duration of the following interval $T_I$ are both 60 msec.

Referring further to FIG. 3, there is shown, at the beginning of time period T, the field proximate to detector 18 to be at a zero emission level, i.e., at an ambient level or at the level which occurs in the absence of an emitted pulse. When a pulse is generated by transmitter 16, at the beginning of a time period $T_p$, the proximate field of detector 18 is dominated thereby. At the conclusion of $T_p$, the proximate field becomes dominated by field $F_{TR}$, the sum of the aforementioned reflected or transient components generated by the pulse, $F_1$, $F_2$ and $F_3$ Field $F_{TR}$ tends to obscure $F_{TD}$, the backscattered target detection signal, until the components thereof have decayed to the zero emission level of the proximate field, the time required therefor comprising a zero emission interval (ZEI).

It will be readily apparent that by judiciously selecting the pulse emission rate of the primary field and the duty cycle thereof so that $T_I$, the interval between pulses, is longer than the zero emission interval, a sub interval of $T_I$ will occur during which neither an emitted pulse, nor the above interfering effects caused by a pulse, will be in the proximate field of detector 18. During such sub interval, hereinafter referred to as a sampling interval (SI), the field proximate to detector 18 is sampled thereby, at a time $S_T$ after the beginning of the preceding pulse. The sampling rate is 8 Hz, and successive samples are spectrum analyzed to detect the presence in the proximate field of a field component of 1 Hz, the frequency of the target detection field.

Referring to FIG. 4, there is shown transmitter 16 provided with oscillator 28, which generates a train of pulses at a rate of 8 pulses per second, the pulses having a 50% duty cycle. The generated pulses are coupled to polarity alternator 30, which comprises a conventional apparatus for periodically reversing the polarity of pulse groups received thereby, at a rate of 2 times per second. The output of polarity alternator 30 thereby comprises successive unipolar pulse groups of four pulses per group, a pulse group of one polarity being immediately followed by a pulse group of opposite polarity. The alternating pulse groups are received by transmitter 32, which responds thereto by emitting primary field 20 through transmitting antenna 22. Transmitting antenna 22 comprises either a vertical magnetic dipole or horizontal magnetic dipole antenna.

Referring further to FIG. 4, there is shown oscillator 28 being operated by clock pulses from clock 34, oscillator 28 generating a pulse of duration $T_p$ each time a clock pulse is received thereby The clock pulses of clock 34 are also coupled to time delay 36, which provides a time delay equal to $S_T$. As aforementioned, $S_T$ is the time elapsing between the commencement of a pulse of field 26 and the sampling of the proximate field of detector 22.

Delayed clock pulses are coupled from time delay 36 to sampler 38 of detector 18, sampler 38 being instantaneously operated thereby to couple total field magnetometer 40 to a spectrum analyzer 42, through amplifier 44. Magnetometer 40 is a conventional magnetometer having sufficiently wide bandwidth, such as 0–1 KHz, that it recovers from an emitted pulse within the zero emission interval following the pulse. Magnetometer 40 continuously responds to the field in proximity to detector 18 through receiving antenna 24. However, by activating sampler 38 at a time $S_T$ after pulse generation has been commenced by oscillator 28, a train of signals representing samples of the field proximate to detector 18 during each of the sampling intervals is coupled to spectrum analyzer 42. Analyzer 42, which may comprise, for example, a standard Fast Fourier Transform (FFT) processor, determines the respective spectral components of the proximate field samples, and displays them by means of a video display device 46. If a 1 Hz spectral component is shown thereby, the presence of a target 14 in environment 12 is indicated. Alternatively, if a 1 Hz component is continuously present in the field proximate to detector 22, for example, due to reflection from aircraft 10, the presence of target 18 is established when the amplitude of the 1 Hz component is noted to suddenly increase.

Referring to FIGS. 5–6, there are shown alternative pulse trains which may be generated by oscillator 28 in order to generate a pulsed magnetic field wherein the amplitude-time characteristics of the pulses of each of the pulse groups are respectively shaped to generate a fundamental frequency component of 1 Hz, the frequency of the target detection field. It may be desirable to generate such modified magnetic field in applications for which one or another specific means of mechanization is simpler or the energy in the higher frequency harmonics requires additional means of control.

While the above embodiment pertains to the detection of an object in a water environment, one of skill in the art could readily modify the above embodiment to provide a system for detecting anomalous targets or anomalies in a portion of the earth's crust. Such anomalies include mineral deposits and tunnels or other void spaces, the conductivity, permeability and permittivity of such anomalies varying from the surrounding earth.

Other modifications and variations of the present invention are possible in the light of the above teachings, and, it is therefore understood that within the scope of the disclosed inventive concept, the invention may be practiced otherwise than as specifically described.

What is claimed is:

1. A method for searching a subsurface environment to detect the presence of a target in the environment, said method comprising the steps of:
   emitting an electromagnetic field comprising successive electromagnetic pulses of selected duty cycle, the time interval between pulses comprising a zero emission interval and a sampling interval, the sampling interval following the zero emission interval, the polarity of successive pulses alternating at a selected alternating frequency;
   projecting said emitted field into said environment from a selected location;
   sampling the electromagnetic field proximate to said selected location during each of said sampling intervals to provide a train of proximate field samples; and
   spectrum analyzing said train of field samples to detect the presence in said proximate field of a field component having a frequency which is equal to said alternating frequency.

2. The method of claim 1 wherein:
   said emitting step comprises the step of emitting a succession of pulses wherein the zero emission interval following a given emitted pulse is of sufficient time duration to allow transient field components and reflected field components generated by said given emitted pulses to become substantially undetectable at said selected location before the conclusion of the zero emission interval following said given emitted pulse.

3. The method of claim 2 wherein:
   said method includes the step of indicating that said proximate field includes a field component having a frequency which is equal to said alternating frequency.

4. The method of claim 2 wherein:
   said emitting step includes the step of alternating the polarity of said pulses each time a selected number of adjacent pulses of the same polarity has been emitted, a selected number of adjacent pulses of the same polarity comprising a pulse group.

5. The method of claim 4 wherein:
   said emitting step comprises the step of generating said pulse groups wherein the amplitude-time characteristics of the pulses of each of said pulse groups are respectively shaped to generate a fundamental frequency component having a frequency which is equal to said alternating frequency.

6. The method of claim 4 wherein said environment comprises a natural body of water, said target comprises an object in said water having a conductivity, permeability or permittivity which is different from the like quantity of said water, and wherein:
   said emitting step comprises the step of emitting said succession of pulses wherein said alternating frequency is equal to the frequency of a target detection field, the frequency of said target detection field being in a frequency range which is on the order of 1 Hz–100 Hz; and
   said projecting step comprises the step of projecting said succession of emitted pulses into said body of water from a selected location in the atmosphere adjacent to said body of water.

7. The method of claim 4 wherein said environment comprises a portion of the earth's crust, said target comprises an anomaly in said portion, and wherein:
   said emitting step comprises the step of emitting said succession of pulses wherein said alternating frequency is equal to the frequency of a target detection field, the frequency of said target detection field being in the Extremely Low Frequency range; and
   said projecting step comprises the step of projecting said succession of emitted pulses into said portion of the earth's crust from a selected location in the atmosphere adjacent to said portion.

8. Apparatus for detecting the presence of an anomalous target located in a subsurface environment, said apparatus comprising:
   oscillating means for generating a train of pulses of selected duty cycle, the time interval between pulses comprising a zero emission interval and a sampling interval, the sampling interval following the zero emission interval;
   means coupled to said oscillating means for alternating the polarity of pulses of said pulse train each time a selected number of pulses has been generated, the frequency at which the polarity of said pulses is alternated being related to a target detection field, the reciprocal of the frequency of said target detection field exceeding said time interval between said pulses;
   means coupled to said alternating means for projecting said pulses into said subsurface environment from a selected location, said projected pulses comprising a primary electromagnetic field;
   means for providing a train of proximate field samples, each of said samples representing the electromagnetic field proximate to said selected location during an instantaneous sampling period which is taken during one of said sampling intervals;
   spectral processing means receiving said proximate field samples for providing the spectra of said proximate electromagnetic signals., and
   means for indicating the presence in said spectra of a component having a frequency equal the frequency of said target detection field.

9. The apparatus of claim 8 wherein:
   said oscillating means comprises means for generating a train of pulses such that said zero emission interval is no less than the time required for transient field components and reflected field components generated by a given one of said projected pulses to become substantially undetectable at said selected location after the conclusion of said given projected pulse; and
   said alternating means comprises means for alternating the polarity of the pulses of said pulse train at a frequency which is equal to the frequency of the fundamental harmonic of a portion of said primary field which is scattered by said target, said harmonic being detectable at said selected location after traversing said environment.

10. The apparatus of claim 9 wherein said means for providing said train of proximate field samples comprises:
    signal detection means located at said selected location; and synchronization means coupled between said oscillating means and said detection means for activating said detection means for an instantaneous time period during each of said sampling intervals.

11. The apparatus of claim 10 wherein said signal detection means comprises:
a wide band magnetic field detector coupled to a receiving antenna situated at said selected location, said magnetic field detector providing an electric signal which represents the electromagnetic field proximate to said selected location; and
a signal sampler which receives said electric signal, and which is activated by said synchronization means to sample said electric signal during each of said sampling intervals, said samples of said electric signal being coupled to said processing means.

* * * * *